United States Patent [19]

Rudolphy et al.

[11] 4,198,329

[45] Apr. 15, 1980

[54] PROCESS FOR THE PREPARATION OF REACTION PRODUCTS OF NATURAL RESINIC ACIDS AND FORMALDEHYDE

[75] Inventors: Albert Rudolphy, Wiesbaden; Wolfgang Dathe, Wiesbaden-Auringen, both of Fed. Rep. of Germany

[73] Assignee: Hoechst Aktiengesellschaft, Frankfurt, Fed. Rep. of Germany

[21] Appl. No.: 948,345

[22] Filed: Oct. 4, 1978

[30] Foreign Application Priority Data

Dec. 15, 1977 [DE] Fed. Rep. of Germany ....... 2755825

[51] Int. Cl.$^2$ ............................................. C08L 93/00
[52] U.S. Cl. ....................................... 260/24; 106/30; 106/239; 260/25; 525/398; 525/509
[58] Field of Search ................... 260/24, 25, DIG. 38; 106/30, 239; 528/231

[56] References Cited

U.S. PATENT DOCUMENTS

| | | | |
|---|---|---|---|
| 2,776,895 | 1/1957 | Biser ........................................ | 106/30 |
| 2,825,657 | 3/1958 | Mock et al. ............................ | 106/239 |
| 3,468,829 | 9/1969 | Yoshioka et al. ...................... | 260/24 X |
| 3,674,732 | 7/1972 | Pitzalis et al. .......................... | 260/25 |
| 3,880,788 | 4/1975 | Rudolphy .............................. | 260/25 |
| 4,075,143 | 2/1978 | Schelhaas et al. ................. | 106/30 X |

OTHER PUBLICATIONS

Rose, Arthur et al., The Condensed Chemical Dictionary, Seventh Ed. Reinhold Publishing Co., N.Y., 1966, pp. 707 and 977.

*Primary Examiner*—Lucille M. Phynes
*Attorney, Agent, or Firm*—Quaintance, Murphy & Richardson

[57] ABSTRACT

Process for the manufacture of resinous products which comprises (a) reacting in a first step, at least one natural resinic acid with 7.5 to 12% by weight, referred to the weight of the natural resinic acids, of a polymeric formaldehyde at a superatmospheric pressure and at a temperature of from 100° to 200° C., (b) in a second stage, increasing the temperature to at least 200° C., but by at least 20° C., and continuing the reaction at atmospheric pressure to yield a partial esterified product having an acid number of 115 to 135, (c) reacting the reaction product obtained from (b) at a temperature of at least 200° C. with an amount of an alkaline-reacting calcium compound sufficient to yield a partial calcium salt having a calcium content of from 3.5 to 4% by weight, referred to the weight of the reaction product;

(d) neutralizing any residual calcium compound by the addition of from 10 to 50% by weight, relative to the weight of the calcium compound added, of a saturated monocarboxylic acid having from 1 to 6 carbon atoms, at a temperature of at least 200° C. and simultaneously completing the salt formation by reaction to yield a reaction product having an acid number of from 20 to 40, the product (e$_1$) then being isolated or (e$_2$) being admixed with up to 5% by weight of natural resinic acids after at least one of stages (b) to (d), and a printing ink containing said products.

10 Claims, No Drawings

PROCESS FOR THE PREPARATION OF REACTION PRODUCTS OF NATURAL RESINIC ACIDS AND FORMALDEHYDE

This invention relates to a process for the preparation of partial esters and partial salts of reaction products of natural resinic acids and formaldehyde, and to the use thereof.

The development of very high-speed printing machines and the trend to print, but only on papers which are normally or only slightly coated, but also increasingly on uncoated papers make especially high demands on the quality of gravure printing inks for such use. These are required to be not only stable, so that they may be stored even when incorporating red, blue and yellow pigments and change their colouration as little as possible, but also to exhibit good pigment wetting, to dry quickly and give the print good durability and a high gloss.

The reaction of rosin with formaldehyde with the intention of simply converting the acid and low-melting natural resinic acids into higher-melting and more neutral products has been described. It is also known that in the preparation of resinates, especially zinc resinates, such reaction products are more resistant to "blocking," that is, to signs of crystallisation, compared with melts of natural resinic acids reacted directly with metal compounds. The reaction of melts of balsam rosin firstly with paraformaldehyde and then either with calcium acetate or calcium hydroxide at 275° to 290° C. has also been described. In this case, however, only resins with an acid number of 5 are obtained, which are not soluble in toluene, but are still just capable of swelling. These resins are therefore not suitable for gravure printing. A further disadvantage of this process is that, despite modification of the rosin with paraformaldehyde, it is not possible to prevent "blocking" from occurring following the addition of zinc oxide after brief reaction, so that it is no longer possible to incorporate calcium hydroxide, as shown by the Examples of this publication.

Although some other Examples describe the preparation of resinates obtained without "blocking", these have melting points of only 74° to 93° C. and are completely turbid.

According to one feature of the present invention there is provided a process for the manufacture of resinous products which comprises (a) reacting, in a first stage, at least one natural resinic acid with 7.5 to 12, preferably 8 to 10% by weight of a polymeric formaldehyde referred to the weight of natural resinic acid, at a superatmospheric pressure and at a temperature of 100° to 200° C.;

(b) in a second stage, increasing the temperature to at least 200° C., but by at least 20° C., and continuing the reaction at atmospheric pressure to yield a partially esterified product having an acid number of 115 to 135;

(c) reacting the reaction product obtained from (b) at a temperature of at least 200° C., preferably at a temperature not lower than that used in (b), with an amount of an alkaline calcium compound sufficient to yield a partial calcium salt having a calcium content of 3.5 to 4% by weight referred to the weight of the reaction product; and (d) neutralising any residual calcium compound by the addition of 10 to 50% by weight, relative to the calcium compound added, of a saturated monocarboxylic acid having from 1 to 6 carbon atoms, and preferably acetic acid, at a temperature of at least 200° C. and simultaneously completing salt formation to yield a reaction product having an acid number of 20 to 40.

The products manufactured according to the process of the invention are distinguished by especially favourable properties for use as printing-ink binders, especially for inks intended for use in toluene gravure printing. Such products are soluble in toluene, do not "block" during their preparation and do not contain any undesired portion of unreacted metal compounds. The products generally have a melting point of at least 130° C. (capillary method) and a viscosity of 50 to 600, preferably 70 to 400 mPa.s (50% toluene/20° C.).

Natural resinic acids which may be used in the process of the invention are, for example, rosin, especially balsam rosin, root resins, tall oil resin, either individually or in admixture.

The partial esterification of stages (a) and (b) is effected by esterification by the carboxyl groups of the natural resinic acid with the methylol groups obtained from the reaction with the polymeric formaldehyde.

The proportion of polymeric formaldehyde which may be used in the process according to the invention, for example in the form of trioxan, preferably paraformaldehyde, should be kept in stage (a) within the range specified in order to obtain a product having the desired properties, in particular to obtain products having a sufficiently high melting point.

Stage (a) of the process is preferably effected at a pressure of 2 to 10 bars, preferably 3 to 6 bars. In many cases, however, stage (a) may be carried out at a superatmospheric pressure outside this range.

Advantageously, the reaction of stage (a) is carried out at a temperature of 125° to 200° C., preferably up to 180° C.; in stages (b) and (c) at a temperature of 200° to 280° C., preferably at 200° to 260° C.; and in stage (d) at a temperature of 200° to 260° C.

The reaction of stage (c) is generally carried out using calcium oxide and/or calcium hydroxide, preferably in the form of a suspension thereof in a suitable solvent. Suspension results in a homogeneous distribution and therefore complete reaction. Solvents which may be used for this purpose are, for example high-boiling media, such as xylene, white spirit, turpentine, mineral oils having a boiling range of up to 280° C., resinic oils having an acid number of less than 20, such as those used in the preparation of natural resinic acids modified with phenol resin, as well as terpene phenol distillates with an acid number of less than 1, as used in the preparation of terpene phenol resins.

The reaction of the carboxylic acid in stage (d) may also be carried out in the presence of a solvent, preferably the same solvent as is used for suspending the calcium compounds used in step (c). The reaction with the carboxylic acid, especially acetic acid, causes not only conversion of unreacted calcium compounds into the corresponding salt, but also serves simultaneously to control the viscosity of the product. Any unreacted carboxylic acid does not necessarily need to be removed, since it does not have a disadvantageous effect on the properties of the final product.

It is also possible, in a further stage (e) of the process of the invention to mix or to modify with up to 5% by weight of natural resinic acids, products which are obtained with higher viscosities than those desired, in order thereby to achieve products with the desired viscosity. Stage (e) may take place with or without a chemical reaction. In the former case, the natural resinic acid is advantageously added after stage (b) and/or after stage (d), although it is also possible to do this after stage (c). At the temperatures applied thereafter or at the temperature at which the resinic acid is added after stage (d), e.g. at 200° to 250° C., modification takes place by reaction.

The products according to the invention have considerably higher melting points than the natural resinic acids used as starting materials. They are very soluble in aromatic hydrocarbons, especially in toluene. Since they also have very good wetting properties on pigments, they are preeminently suitable as binding agents for toluene gravure printing inks. As such, they show rapid drying, a high gloss, high colour strength and good durability on coated and uncoated paper. Thus according to a further aspect of the present invention there is provided a printing ink composition, preferably a gravure printing ink composition, containing a reaction product obtained from the process of the present invention. Especially advantageous is the behaviour in storage of toluene gravure printing inks prepared with yellow pigments, because they not only remain generally stable in respect of their viscosity, but also show substantially less tendency to turn green than commercial resinates.

The following Examples serve to illustrate the process according to the invention and printing inks produced from the products thereof. In the Examples, unless specified otherwise, T represents parts by weight and % represents % by weight. The viscosity values always relate to a 50% toluene solution/20° C. The melting points (Mp) were determined by the capillary method.

EXAMPLES

For stage (a), the natural resinic acids or mixtures thereof are melted; paraformaldehyde is added to the mixture heated to 100° to 120° C., the mixture being brought to the desired temperature with stirring in a pressure vessel. When the reaction is complete stage (b) is effected at atmospheric pressure and the mixture is heated to above 200° C. for partial esterification, water containing formaldehyde being evaporated off.

The following Table 1 gives a summary of stages (a) and (b). The acid numbers given were determined by means of methanolic potassium hydroxide.

Table 1

| Example | 1 | 2 | 3 | 4 | 5 |
| --- | --- | --- | --- | --- | --- |
| Starting materials | | | | | |
| Portuguese rosin (T) Mp. 65° C., Acid No. 165 | 3000 | 3000 | 2400 | — | — |
| American root resin (T) Mp. 62° C., Acid No. 162 | — | — | — | 3000 | — |
| American tall oil resin (T) Mp. 58° C., Acid No. 160 | — | — | 600 | — | 3000 |
| Paraformaldehyde (T) | 225 | 300 | 300 | 255 | 360 |
| Stage a) - Reaction at superatmospheric pressure. | | | | | |
| Temperature 160° C. | + | + | + | + | + |
| Maximum pressure (bars) | 3.5 | 4.8 | 3.8 | 4.2 | 5.6 |
| Minimum pressure (bars) | 1.8 | 2.5 | 2.2 | 2.0 | 2.8 |
| Reaction time (4 h) | + | + | + | + | + |
| Stage b) - Partial esterification at atmospheric pressure. | | | | | |
| Reaction 1h/250° C. | + | + | + | + | + |
| Yield (T) | 3070 | 3100 | 3060 | 3080 | 3125 |
| Melting point (Mp) (°C.) | 80 | 82 | 81 | 78 | 85 |
| Acid Number | 127 | 122 | 123 | 126 | 115 |

As indicated in Table 1, after stages (a) and (b) the melting point is already increased in comparison with that of the starting resinic acids with a simultaneous lowering of the acid number.

The following Examples illustrate the further processing in stages (c) to (d):

600 T of a sample according to Examples 1 to 5 is reacted in stage c) with calcium oxide or calcium hydroxide, optionally in suspension in a solvent, and in stage (d) with acetic acid (99%), optionally together with the same organic solvent as in stage (c). Table 2 gives a summary of Examples 1a to 5d and the products obtained.

1a—15 minutes after the addition of calcium oxide (not in suspension) the acetic acid is added dropwise and the mixture is heated to 220° to 260° C. until the acid number has fallen to approximately 35. After removal of the volatile fractions under reduced pressure the reaction product is obtained. 0.9 T of calcium oxide were not reacted.

1b—This Example is effected as in Example 1a, but with a suspension of calcium oxide and with acetic acid in xylene. Despite the rather higher quantity of calcium oxide the latter is reacted completely owing to its homogeneous distribution in the solvent.

The products of Examples 1a and 1b yield quick-drying printing inks with a high gloss, good colour strength and good hold-out on coated and natural resin paper.

2a—The sample from Example 2 is melted. 1 hour after the addition of the calcium hydroxide suspension the acetic acid is added at 250° C. The process is continued as in Example 1a.

3a to 5d—The solvent for the calcium hydroxide suspension according to Example 3a is mineral oil having a boiling range of 240° to 270° C., for Examples 3b, 4b and 5b to 5d is a distillate (acid number=0) obtained from the preparation of terpene pnenol resins, and for Examples 4a and 5a is a resin oil (acid number=12) obtained from the preparation of natural resinic acids modified with phenol resin. In Examples 5c and 5d natural acids are added additionally after stage d).

5V (Comparison Example to 5b)—In this Comparison Example the addition of a carboxylic acid is omitted. Consequently, the viscosity of the final product is considerably higher than that of the final product of Example (5b).

Table 2

| Example | 1 | | 2 | | 3 | | 4 | |
| --- | --- | --- | --- | --- | --- | --- | --- | --- |
| | a | b | a | b | a | b | a | b |
| Stage c) | | | | | | | | |
| Temp. (°C.) | 220-260 | 220-260 | | | 230-260 | 230-260 | 230-260 | 230-260 |
| CaO (T) | 32 | 33 | — | — | 16 | — | — | — |
| Ca(OH)$_2$(T) | — | — | 39 | 41 | 20 | 41 | 39 | 41 |
| Organic Solvent(T) | — | 33 (xylene) | 30 (turpentine) | 60 (white-spirit) | 35 (mineral oil) | 30 | 30 (resin oil) | 30 |

Table 2-continued

| Stage d) (+e) | | | | | | | | |
|---|---|---|---|---|---|---|---|---|
| Acetic acid (T) | 10 | 15 | 10 | 15 | 15 | 17 | 10 | 15 |
| Organic Solvent (T) | — | 15 | 10 | 20 | 15 | 12 | 10 | 15 |
| Natural resin (T) | — | — | — | — | — | — | — | — |
| Final Product (T) | 603 | 600 | 597 | 595 | 605 | 600 | 603 | 595 |
| Melting point (T) | 140 | 143 | 137 | 147 | 140 | 147 | 139 | 144 |
| Acid Number | 35 | 33 | 27 | 25 | 30 | 26 | 24 | 24 |
| Viscosity (50% toluene 20° C.) (mPa.s) | 70 | 110 | 125 | 300 | 150 | 305 | 120 | 273 |

| Example | 5 a | 5 b | V Comparison 5b | c | d | Comparison Sample A | Comparison Sample B |
|---|---|---|---|---|---|---|---|
| Stage c) | | | | | | | |
| Temperature (°C.) | 230-260 | 230-260 | 230-260 | 230-260 | 230-260 | | |
| CaO (T) | — | — | — | — | — | | |
| Ca(OH)$_2$ (T) | 39 | 41 | 41 | 41 | — | | |
| organic solvent (T) | 30 (resinic oil) | 30 (as 4b) | 30 (as 4b) | 30 (as 4b) | — | | |
| Stage d) (+e) | | | | | | | |
| Acetic acid (T) | 10 | 15 | — | 15 | 15 | | |
| Organic Solvent (T) | 10 | 15 | — | 15 | 15 | | |
| natural resin (T) | — | — | — | 20 | 30 | | |
| Final Product (T) | 600 | 592 | 594 | 616 | 624 | — | — |
| Melting point (°C.) | 150 | 154 | 148 | 147 | 146 | 134 | 141 |
| Acid Number | 22 | 20 | 23 | 23 | 21 | 43 | 49 |
| Viscosity (50% toluene 20° C.) (mPa.s) | 220 | 558 | 954 | 340 | 200 | 90 | 270 |

Printing Test (a) Preparation of the printing inks

The final products according to the previous Examples were dissolved in toluene and mixed with suitable pigments. For red inks, 20% red pigment was added; for blue inks, 16% blue pigment; and for yellow inks, 12% yellow pigment were added. 100 T of 50% toluene solutions were mixed with enough toluene to give an efflux time of 17 seconds in a DIN 4-mm beaker.

Discussion of the Results of Table 3

(a) and (b) red inks

The following Table 3 shows that all inks of type (a) and (b) (with the exception of Example 4a) dry at least as quickly as the ink from the comparison resin considered, but on average more quickly. With all the Examples the gloss is more favourable than that of the Comparison Examples. Also, durability on paper is at least equivalent to that of the Comparison Example and in most cases it is superior thereto. The stability in storage of the red inks corresponds to that of the Comparison Example.

(c) blue inks

With the exception of Example 5c which has the same drying characteristics as the Comparison Example, all the other Examples show more rapid drying with a markedly improved gloss. Durability on paper is better in all cases than with the Comparison Example. Stability in storage is also more favourable.

Table 3

| | 1a | 1b | 2a | 3a | 4a | Comparison resin A | 2b | 3b | 4b | 5a | 5c | 5d | Comparison resin B |
|---|---|---|---|---|---|---|---|---|---|---|---|---|---|
| | a) Red inks from binding agents of viscosity 70-150mPa.s | | | | | | b) Red inks from binding agents of viscosity 150-400 mPa.s | | | | | | |
| DIN 4-mm efflux time of inks/25° C./S | 17 | 16.9 | 17.1 | 17 | 16.9 | 17.1 | 16.9 | 17.2 | 17 | 17.3 | 17.1 | 17 | 16.9 |
| Drying of 36μm wet layer on coated paper/s | 40 | 38 | 36 | 37 | 45 | 40 | 35 | 36 | 37 | 40 | 41 | 42 | 43 |
| Gloss | 85 | 79 | 81 | 86 | 90 | 73 | 75 | 72 | 70 | 74 | 80 | 82 | 60 |
| Durability of 6μm wet layer thickness on coated paper[60g/m$^2$] as comparison ink A B | + | + | — | — | — | + | — | — | — | — | + | + | + |

Table 3-continued

| ink | | | | | | | | | | | | | |
|---|---|---|---|---|---|---|---|---|---|---|---|---|---|
| better than ink A B | − | − | + | + | + | | + | + | + | + | − | − | |
| worse than ink A B | − | − | − | − | − | | − | − | − | − | − | − | |
| DIN 4-mm efflux time after 14 days/24° C./s | 19.4 | 19 | 19.2 | 18.9 | 19.5 | 19.3 | 18.6 | 18.9 | 18.4 | 18.7 | 18.7 | 18 | 18.8 |

| | | | | Comparison resin A | | | | Comparison resin B |
|---|---|---|---|---|---|---|---|---|
| | | 2b | 3a | | 3b | 4b | 5c | | c) Blue inks

| | 2b | 3a | Comparison resin A | 3b | 4b | 5c | Comparison resin B |
|---|---|---|---|---|---|---|---|
| DIN 4-mm efflux time of inks/25° C./S | 17.1 | 16.9 | 17 | 17 | 17 | 17.1 | 17.1 |
| Drying of 36μm wet layer on coated paper | 40 | 42 | 43 | 40 | 42 | 45 | 45 |
| Gloss | 74 | 70 | 63 | 64 | 65 | 70 | 55 |
| Durability of 6μm wet layer thickness on coated paper [60g/m²] | | | | | | | |
| as comparison A B ink | − | − | + | − | − | − | + |
| better than ink A B | + | + | − | + | + | + | − |
| worse than ink A B | − | − | − | − | − | − | − |
| DIN 4-mm efflux time after 14 days/24° C./s | 20.3 | 20.5 | 21 | 20 | 19 | 19.8 | 20.6 |

(d) yellow inks

Improved durability on paper is also obtained with yellow inks. To test stability in storage, a portion of the yellow inks were stored in a refrigerator and the major portion in screw-cap bottles for 7 days at 40° C. After a further day of storage at room temperature, the inks stored under refrigeration and the inks stored at 40° C. were applied next to one another to coated paper with a wet-layer thickness of 12 μm by means of a wire coil and then assessed for their tendency to turn green. Also, the efflux time in a DIN 4 mm beaker at 25° C. was determined.

The results for the yellow inks are summarised in the following Table 4.

Table 4 shows that the products prepared according to the invention as binding agents provide the yellow printing inks with not only better stability in storage, but also better stability of colouration.

Table 4

| Example | 1a | 1b | 2a | 2b | 3a | 3b | 4a | 4b | 5a | 5d | 5e | Comparison resin A | B |
|---|---|---|---|---|---|---|---|---|---|---|---|---|---| d) yellow inks

| | 1a | 1b | 2a | 2b | 3a | 3b | 4a | 4b | 5a | 5d | 5e | A | B |
|---|---|---|---|---|---|---|---|---|---|---|---|---|---|
| DIN 4-mm efflux time of inks/ 25° C./s | 32 | 28 | 30 | 27 | 30 | 26 | 28 | 26 | 30 | 33 | 36 | 44 | 48 |
| Turning green of inks: | | | | | | | | | | | | | |
| Slight | + | + | + | + | + | + | + | + | + | + | + | − | − |
| Marked | − | − | − | − | − | − | − | − | − | − | − | + | + |
| Strong | − | − | − | − | − | − | − | − | − | − | − | + | − |

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. Process for the manufacture of resinous products which comprises
    (a) reacting in a first step, at least one natural resinic acid with 7.5 to 12% by weight, referred to the weight of the natural resinic acids, of a formaldehyde at a superatmospheric pressure and at a temperature of from 100° to 200° C.,
    (b) in a second stage, increasing the temperature to at least 200° C., but by at least 20° C., and continuing the reaction at atmospheric pressure to yield a partial esterified product having an acid number of 115 to 135,
    (c) reacting the reaction product obtained from (b) at a temperature of at least 200° C. with an amount of an alkaline-reacting calcium compound sufficient to yield a partial calcium salt having a calcium content of from 3.5 to 4% by weight, referred to the weight of the reaction product;
    (d) neutralizing any residual calcium compound by the addition of from 10 to 50% by weight, relative to the weight of the calcium compound added, of a saturated monocarboxylic acid having from 1 to 6 carbon atoms, at a temperature of at least 200° C. and simultaneously completing the salt formation by reaction to yield a reaction product having an acid number of from 20 to 40, the product
    ($e_1$) then being isolated or
    ($e_2$) being admixed with up to 5% by weight of natural resinic acids after at least one of stages (b) to (d).

2. A process as claimed in claim 1 wherein the reaction of stage (a) is conducted at a temperature in the range from 125° to 200° C. and that each of the stages (b) and (c) is conducted at a temperature in the range from 200° to 280° C.

3. A process as claimed in claim 1 wherein the temperature applied in stage (c) is not lower than that applied in stage (b).

4. A process as claimed in claim 1 wherein the calcium compound reacted in stage (c) is selected from the group consisting of calcium oxide, calcium hydroxide and a mixture thereof.

5. A process as claimed in claim 1 wherein the calcium compound reacted in stage (c) is added in the form of a suspension in an organic solvent.

6. A process as claimed in claim 1 wherein the monocarboxylic acid reacted in stage (d) is acetic acid.

7. A process as claimed in claim 1 wherein the carboxylic acid reacted in stage (d) is added in admixture with the same solvent which is the suspension medium of the calcium compound.

8. A process as claimed in claim 1 wherein the final product has a melting point of at least 130° C. (capillary method) and a viscosity between 50 and 600 mPa.s (in a 50% solution in toluene at 20° C.).

9. A printing ink binder containing as an essential ingredient a reaction product obtained according to the process of claim 1.

10. A gravure ink composition in toluene containing as an essential ingredient a product obtained by a process of claim 1.

* * * * *